US009739906B2

(12) United States Patent
Forstner et al.

(10) Patent No.: US 9,739,906 B2
(45) Date of Patent: Aug. 22, 2017

(54) SYSTEM AND METHOD FOR DEFINING PERMISSIBLE BOREHOLE CURVATURE

(71) Applicants: Ingo Forstner, Ahnsbeck (DE);
Christian Herbig, Celle (DE);
Christian Linke, Wienhausen (DE);
Andreas Hohl, Hannover (DE)

(72) Inventors: Ingo Forstner, Ahnsbeck (DE);
Christian Herbig, Celle (DE);
Christian Linke, Wienhausen (DE);
Andreas Hohl, Hannover (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 672 days.

(21) Appl. No.: 14/104,428

(22) Filed: Dec. 12, 2013

(65) Prior Publication Data
US 2015/0167453 A1 Jun. 18, 2015

(51) Int. Cl.
| | | |
|---|---|---|
| *G01V 1/40* | (2006.01) | |
| *G01V 3/18* | (2006.01) | |
| *G01V 5/04* | (2006.01) | |
| *G01V 9/00* | (2006.01) | |
| *G01V 99/00* | (2009.01) | |
| *E21B 7/04* | (2006.01) | |

(52) U.S. Cl.
CPC ............ *G01V 99/00* (2013.01); *E21B 7/04* (2013.01)

(58) Field of Classification Search
CPC ........ G01V 99/00; G01V 11/002; E21B 7/04; G05B 19/4097; G05B 19/4181; G05B 19/406; G05B 2219/45129; G06Q 10/06; G06Q 10/00; E02D 37/00

USPC .......................................................... 702/11
See application file for complete search history.

(56) References Cited

U.S. PATENT DOCUMENTS

| | | |
|---|---|---|
| 7,020,597 B2 | 3/2006 | Oliver et al. |
| 7,503,403 B2 | 3/2009 | Jogi et al. |
| 7,556,104 B2 | 7/2009 | Jeffryes |
| 8,010,290 B2 | 8/2011 | Illfelder |
| 8,210,283 B1 | 7/2012 | Benson et al. |
| 2003/0037963 A1 | 2/2003 | Barr et al. |
| 2004/0050590 A1 | 3/2004 | Pirovolou |
| 2004/0163443 A1 | 8/2004 | McElhinney |
| 2005/0240350 A1 | 10/2005 | Engebretson et al. |
| 2010/0185395 A1 | 7/2010 | Pirovolou et al. |
| 2010/0241410 A1 | 9/2010 | McElhinney et al. |
| 2011/0214878 A1* | 9/2011 | Bailey ...................... E21B 7/00 166/369 |
| 2012/0046865 A1 | 2/2012 | Heisig et al. |

(Continued)

OTHER PUBLICATIONS

The Merriam-Webster Dictionary, 2005 New Edition, (c) 2005, Merriam-Webster Inc, Springfield, Massachusetts.*

(Continued)

*Primary Examiner* — Roy Y Yi
(74) *Attorney, Agent, or Firm* — Cantor Colburn LLP

(57) ABSTRACT

A method for defining a permissible borehole curvature includes determining curvature characteristics of at least one of a borehole and a downhole assembly in the borehole and calculating an envelope of permissible borehole curvatures from a predetermined location in the borehole based on the curvature characteristics, a direction of the borehole at the predetermined location in the borehole, and a turning angle of the borehole relative to the direction of the borehole at the predetermined location.

25 Claims, 4 Drawing Sheets

(56) References Cited

U.S. PATENT DOCUMENTS

| | | |
|---|---|---|
| 2012/0046868 A1 | 2/2012 | Tchakarov et al. |
| 2012/0330551 A1 | 12/2012 | Mitchell et al. |
| 2013/0032401 A1 | 2/2013 | Edbury et al. |
| 2013/0041586 A1 | 2/2013 | Schuberth et al. |

OTHER PUBLICATIONS

Brett et al., "Uses and Limitations of Drillstring Tension and Torque Models for Monitoring Hole Conditions", Amoco Production Co., Sep. 1989, Abstract.

Gillian et al., "Applying Computer Based Precision Drill Pipe Rotation and Oscillation to Automate Slide Drilling Steering Control", Society of Petroleum Engineers, Nov. 2011, Abstract.

Heisig et al., "Continuous Borehole Curvature Estimates While Drilling Based on Downhole Bending Moment Measurements", Society of Petroleum Engineers, Sep. 2004, Abstract.

Mason et al., "Step Changes needed to Modernise T&D Software", Society of Petroleum Engineers, Feb. 2007, Abstract.

McSpadden et al., "Advanced Casing Design With Finite-Element Model of Effective Dogleg Severity, Radial Displacements, and Bending Load", Society of Petroleum Engineers, Sep. 2012, Abstract.

International Search Report and Written Opinion; International Application No. PCT/US2014/069076; International Filing Date: Dec. 8, 2014; Date of Mailing: Mar. 31, 2015; 14 Pages.

Justo Matheus and Siva Naganathan, "Automation of Directional Drilling—Novel Trajectory Control Algorithms for RSS" Schlumberger Source IADC/SPE Drilling Conference and Exhibition, Feb. 2010, New Orleans, Louisiana, USA.

S.J. Sawaryn, "A Compendium of Directional Calculations Based on the Minimum Curvature Method—Part 2", SPE, BP Exploration, M.A. Tulceanu, SPE, Total Source SPE Annual Technical Conference and Exhibition, Nov. 11-14, 2007, California, USA.

\* cited by examiner

SYSTEM AND METHOD FOR DEFINING PERMISSIBLE BOREHOLE CURVATURE

BACKGROUND

Wellbores may be formed to have various trajectories and curvatures by controlling the direction of drills. In many cases, specific curvatures are required in a wellbore to reach materials in the earth or avoid locations in earth formations. The degree and characteristics of the trajectories and curvatures depends on the downhole equipment, operating parameters, and properties of earth formation and fluids. However, drilling a wellbore to include curves necessarily results in curves in the drill string, completion equipment or anything else that is inserted in the wellbore during or after drilling. These curves introduce strains and stresses which may result in damage or other impact to downhole equipment and services. To avoid damage to downhole equipment, avoid excess friction, and avoid measurement quality reduction, wellbore curvatures are typically calculated to be smaller than a fixed maximum curvature.

SUMMARY

According to an embodiment of the invention, a method for defining a permissible borehole curvature includes determining curvature characteristics of a downhole assembly in a borehole or curvature characteristics of a borehole and calculating, by a processor of a computer, an envelope of permissible borehole curvatures from a predetermined location in the borehole based on the curvature characteristics, a direction of the borehole at the predetermined location in the borehole, and a turning angle of the borehole relative to the direction at the predetermined location.

According to another embodiment of the invention, a borehole system includes memory configured to store curvature characteristics of a downhole assembly configured to be inserted in a borehole or curvature characteristics of a borehole. The system also includes a processor configured to calculate an envelope of permissible borehole curvatures from a predetermined location in the borehole based on the curvature characteristics, a direction of the borehole at the predetermined location in the borehole, and a turning angle of the borehole relative to the direction at the predetermined location.

According to another embodiment of the invention, a borehole system includes a downhole assembly located in a borehole, a borehole support structure, and a borehole analysis computer configured to determine an envelope of permissible borehole curvatures from a predetermined location in the borehole based on the curvature characteristics, a direction of the borehole at the predetermined location in the borehole, and a turning angle of the borehole relative to the direction at the predetermined location.

BRIEF DESCRIPTION OF THE DRAWINGS

Referring now to the drawings wherein like elements are numbered alike in the several Figures.

DETAILED DESCRIPTION

Figure 1:
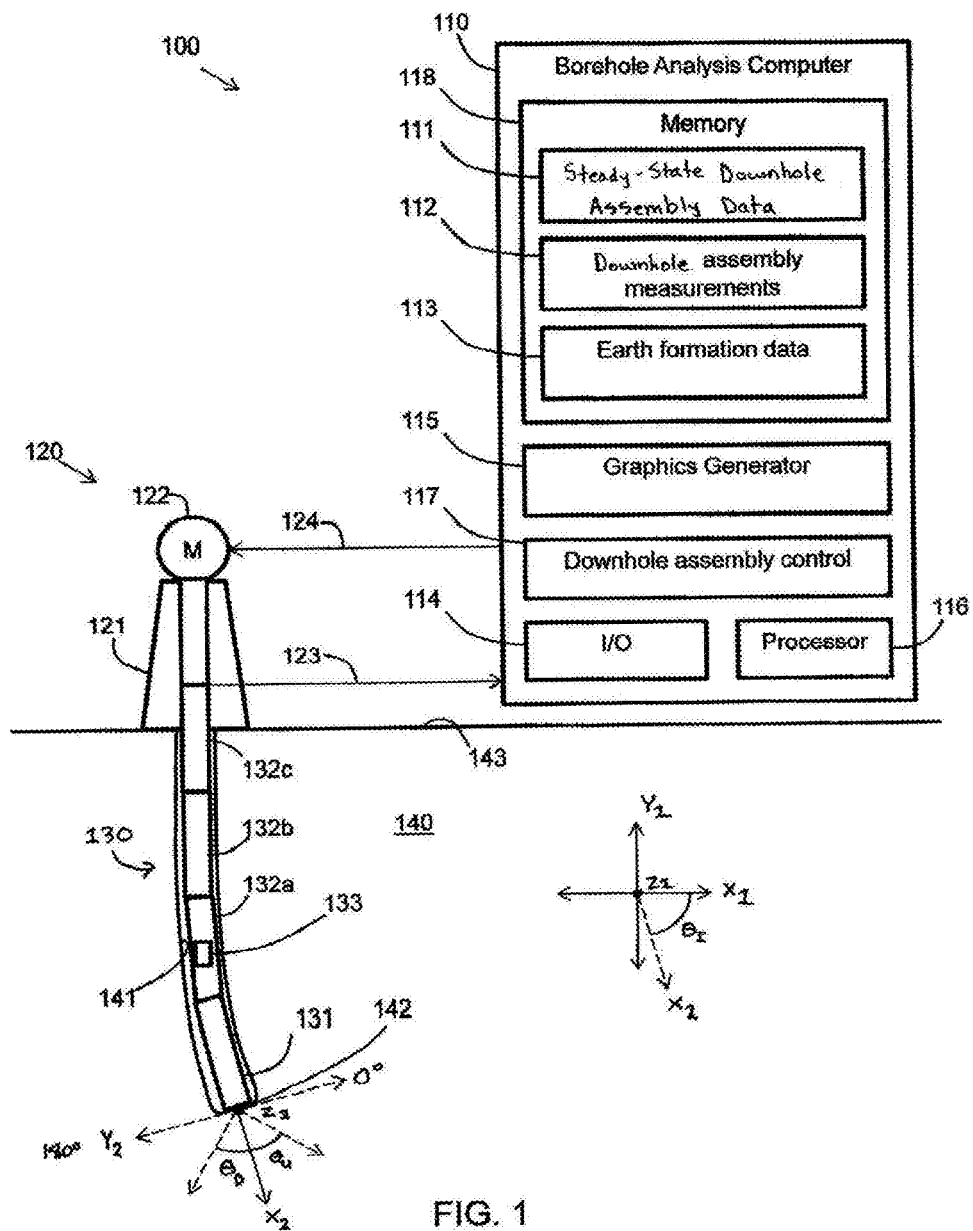
FIG. 1 illustrates a borehole system according to an embodiment of the invention.

FIG. 1 illustrates a borehole system 100 according to an embodiment of the invention. The system 100 includes a borehole analysis computer 110, a borehole support structure 120, also referred to as a derrick 120, and a downhole assembly 130 located inside a borehole 141 in the earth 140. The derrick 120 may include a structural housing 121 and a motor 122 to control the rotation and the axial movement along the borehole of the downhole assembly 130 in the borehole 141. The derrick 120 may receive control signals 124 from the borehole analysis computer 110 and the derrick 120, and may transmit data 123 to the borehole analysis computer 110. The data 123 may include sensor data, data regarding characteristics of the derrick 120, data regarding the downhole assembly 130, data regarding the borehole 141, data regarding the borehole fluid and data regarding the earth 140 around the borehole 141, and data regarding the fluid in the earth. Examples of data regarding the downhole assembly 130 include rotational velocity, rate of penetration, vibration data, bending load, bending moment and wear. Examples of data regarding the borehole 141 include azimuth, inclination, borehole diameter, cavities, borehole shape, and temperature. Examples of data regarding the borehole fluid include viscosity, temperature, pressure, chemical composition, resistivity, sound speed, density, and cutting load. Examples of data regarding the earth 140 around the borehole 141 include resistivity, acoustic characteristics, formation pressure, temperature, gamma characteristics, chemical composition, mineralogy, porosity, permeability, and density.

While FIG. 1 illustrates the borehole analysis computer 110 as being on the surface 143 of the earth 140, embodiments of the invention encompass portions of the borehole analysis computer 110 being located inside the borehole 141. Similarly, while FIG. 1 illustrates the borehole analysis computer 110 as being separated from the borehole support structure 120, embodiments of the invention encompass portions of the borehole analysis computer 110 being part of the borehole support structure 120. Further, while FIG. 1 illustrates only one borehole analysis computer 110, it will be appreciated by those skilled in the art that parts and functionalities of the borehole analysis computer 110 may be distributed and executed by more than one computer with the parts in the separated computers communicating in a way to provide the functionalities outlined in this description. In addition, while FIG. 1 illustrates an actual borehole 141, embodiments of the invention encompass a computer that analyzes or predicts a borehole that does not yet exist. In other words, embodiments of the invention may be used to plan or pre-evaluate the formation of a borehole rather than analyze characteristics of a presently-existing borehole.

In one embodiment, the downhole assembly is a downhole pipe string. The downhole pipe string may be a drilling string, a well completion string, a completion string, a workover string or any other string used to perform functions in the wellbore 141. The downhole assembly 130 includes multiple segments 132a to 132c and a downhole end segment 131. In one embodiment, the downhole end segment 131 is a drilling assembly which may include a drilling tool, a steering tool, a drill bit, or a drill bit segment. In one embodiment, the downhole assembly 130 includes one or more sensors 133 to gather data, including data regarding the downhole assembly 130, operational parameters, borehole 141 data, or data about the earth 140 or the fluid around the borehole 141. In one embodiment, the downhole assembly 130 includes a steering tool to steer the borehole into a desired direction.

In the present specification and claims, the axes $x_1$, $y_1$, and $z_1$ define a frame of reference $xyz_1$ that corresponds to horizontal and vertical directions with respect to direction of gravity. —The axes $x_1$ and $z_1$ define a plane $xz_1$ that is perpendicular to the direction of gravity. The x1 axis is typically chosen to a specific reference direction, for instance the projection of the earth's magnetic field line into the plane that is perpendicular to the direction of gravity. The axis $y_1$ is an axis parallel to the direction of gravity. The z1 direction is chosen to complete a right-handed Cartesian coordinate system. The direction of axis $x_2$ of the borehole 141 at the location 142 corresponds to a line that extends axially from an end of the borehole 141.

In some embodiments, the direction of axis $x_2$ of the borehole 141 corresponds to the direction of the longitudinal axis of the downhole end segment 131, such that the axis $x_2$ extends axially through the downhole end segment 131 as illustrated in FIG. 1. An inclination angle $\theta_I$ of the borehole 141 corresponds to the angle between the axis $y_1$ and the axis $x_2$ of the borehole 141 at the location 142.

In addition, in the present specification and claims, the axis $x_2$ of the borehole 141 at the location 142 defines one axis of a local frame of reference $xyz_2$. Axes $y_2$ and $z_2$ are perpendicular to axis $x_2$, and also define a plane $yz_2$ in a way that xyz2 defines a right-handed Cartesian coordinate system. In operation, the downhole end segment 131 may be tilted up, down, left, right with respect to the axis $x_2$, or any combination thereof to form a borehole 141 ahead of the location 142 having a particular curvature. In FIG. 1, a tilt upward is represented by $\theta_U$, and a tilt downward is represented by $\theta_D$, where $\theta_U$ and $\theta_D$ are measured with respect to the axis $x_2$ of the borehole 141 at the location 142.

Figure 2:
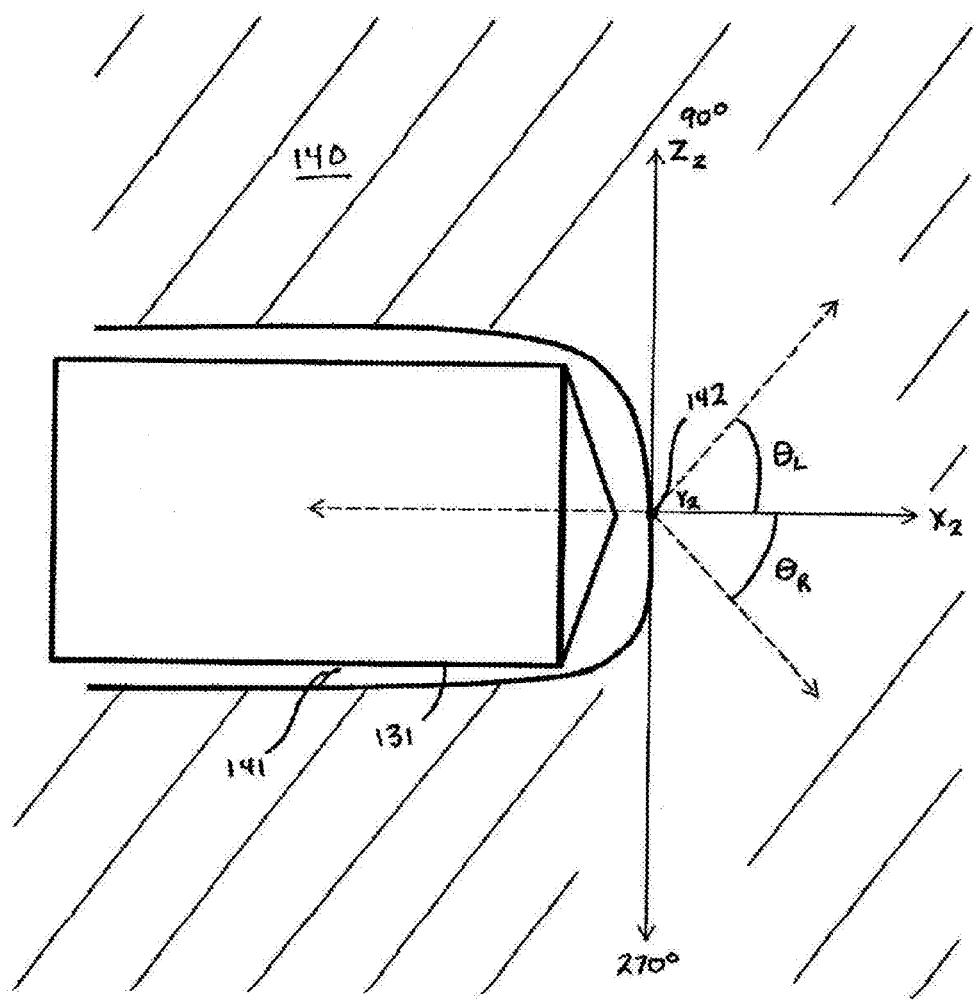
FIG. 2 illustrates a downhole end of a downhole assembly according to an embodiment of the invention.

FIG. 2 provides view along the axis $y_2$ parallel to the projection of the direction of gravity into the plane perpendicular to x2 of the downhole end segment 131 and the borehole 141. However, embodiments of the invention encompass an axis $y_2$ parallel to any reference axis or direction. Referring to FIG. 2, a left tilt $\theta_L$ is a tilt to one side of the axis $x_2$ in the plane xz2 and a right tilt $\theta_R$ is a tilt to the other side of the axis $x_2$ in the plane xz2. The left and right tilts $\theta_L$ and $\theta_R$ are defined relative to the local frame of reference $xyz_2$, and in particular with respect to the axis $x_2$ of the borehole 141 at the location 142 in the plane xz2.

While the local frame of reference $xyz_2$ has been described above with respect to the borehole 141 at the location 142, embodiments of the invention encompass other objective frames of reference, such as a frame of reference defined by the downhole end segment 131 of the downhole assembly 130. In addition, other Cartesian or non-Cartesian coordinate systems may be used to describe or implement embodiments of the invention, such as a polar coordinate system.

Referring again to FIG. 1, the borehole analysis computer 110 stores steady-state downhole assembly data 111 and downhole assembly measurements 112. Steady-state downhole assembly data 111 includes characteristics of the downhole assembly 130 that generally do not change over time during the drilling operation, such as design specifications, temperature and stress tolerances as well as tolerances for bulk external and internal loads such as bending moment limits, fatigue limits based on material stress tolerances, tool geometry data, environmental data, and failure theories and other component specifications. The downhole assembly measurements 112 include measurement of data that might change over time such as measured strain levels, temperature levels, power consumption levels, drilling fluid information, and any other information pertaining to the downhole assembly 130 that may be measured or derived during operation of the borehole system 100.

The borehole analysis computer 110 also stores or processes earth formation data 113, which may include chemical and physical data of the earth 140 surrounding the borehole 141. In one embodiment, the steady-state downhole assembly data 111, the downhole assembly measurements 112, and the earth formation data 113 are stored in memory 118, which may include any type of data storage device, including one or both of volatile memory and non-volatile memory. In an embodiment in which the calculation of an envelope of permissible curvatures is for subsequent downhole assembly, all of the steady-state downhole assembly data 111, the downhole assembly measurements 112, and the earth formation data 113 are stored in memory 118. In embodiments in which the calculation of the envelope of permissible curvatures is for a downhole assembly currently located in the borehole 141, at least some of the steady-state downhole assembly data 111, the downhole assembly measurements 112, and the earth formation data 113 may be supplied from the downhole assembly 130 in real-time.

The borehole analysis computer 110 further includes an input/output (I.O.) module 114, which may include a user interface, wireless or wired connections, or any other type of mechanism for transmitting and receiving data from a source external to the borehole analysis computer 110. The borehole analysis computer 110 may include a graphics generator 115 including graphics data and programs executed by a processor 116 to display graphics representing borehole data or downhole assembly data or earth formation data or fluids data.

The borehole analysis computer 110 may also include a downhole assembly control module 117, including control software and corresponding hardware circuitry to control operation of the downhole assembly 130, such as by generating control signals to control the derrick 120 or control signals to control the tilt or turn angles or deflection from the centerline of the borehole or any other parameter suitable to control the downhole assembly, for instance to drill the borehole or to steer the direction of the borehole.

In operation, the borehole analysis computer 110 analyzes the steady-state downhole assembly data 111, the downhole assembly measurements 112, and the earth formation data 113 in memory 118 to determine a permissible curvature of the borehole or downhole assembly or of a subsequent downhole assembly. In other words, the borehole analysis computer 110 may determine an angle change per borehole length interval to which the borehole 141 may curve upward ($\theta_U$), downward ($\theta_D$), left ($\theta_L$), right ($\theta_R$) or any combination of the above without reaching a predetermined threshold, such as a predetermined level of bending moment, fatigue, maximum ratio of bending moment and fatigue limit, strain on the downhole assembly 130 or a predetermined effectiveness of a sensor 133.

Other limiting curvature characteristics of the downhole assembly 130 or the borehole 141 may include logging-while-drilling measurement accuracy or accuracy of any other or subsequent measurement equipment in the same borehole, avoidance of another borehole, predicted or observed excessive cumulative friction along the borehole for the downhole assembly at a future depth or operating mode, predicted or observed excessive cumulative friction along the borehole for any subsequent downhole assembly in the same borehole at any future depth or operating mode, predicted or observed excessive wear at any given position along the downhole assembly, predicted or observed instability of an earth formation, predicted or observed differential sticking, predicted or observed keyseating, predicted or observed length of a hole section in a section of interest (e.g. drain section of a reservoir), and avoiding predicted or detected earth faults or other formation events such as shale lenses or reservoir boundaries. In addition, in some embodiments, financial considerations may be limiting factors. For example, curving a downhole assembly in one direction may incur a greater expense than in another direction.

The determination of limiting curvature characteristics of the downhole assembly 130 or borehole 141 may be defined based on downhole assembly data or measurements such as torque and drag, borehole data such as wellbore integrity issues, hole cleaning, whipstock setting requirements, and earth formation data such as avoidance of undesired collision with particular zones downhole such as neighboring wells or formation events (e.g. shale lenses, earth faults, reservoir boundaries), etc.

Yet additional limiting curvature characteristics include cumulative contact forces or friction eventually extrapolated, e.g. to the end of the hole section or hole total depth for the downhole assembly; cumulative contact forces or friction eventually extrapolated, e.g. to the end of the hole section or hole total depth for any subsequent downhole assembly, such as casing string or next drilling downhole assembly; local wall contact forces or stresses that may cause failures of sensors or other parts of the downhole assembly; formation damage; risk of collision with another well; reacting to deflection of a hard interface; or any other limiting curvature characteristics.

While an embodiment is described with respect to determining maximum borehole curvatures or downhole assembly curvatures, it is understood that embodiments are not limited to maximums, but may also include determining minimum borehole curvatures or downhole assembly curvature thresholds. Such minimum curvature thresholds may be used, for example, to reduce lateral vibration or to exit a motherbore and create a side track.

The steady-state downhole assembly data 111 analyzed by the borehole analysis computer 110 includes downhole assembly curvature characteristics, which are defined as characteristics of the downhole assembly 130 that are affected when the downhole assembly 130 is curved into a particular shape. The borehole analysis computer 110 may also store borehole curvature characteristics, defined as characteristics of the borehole that are affected based on the curve of the borehole. For example, a downhole assembly 130 may have a slightly inclined and substantially straight shape at a depth of 1000 meters which results in a first curvature characteristic of the downhole assembly (such as low wear or low bending fatigue). If the borehole curves sharply at a borehole depth of 1500 meters, then the downhole assembly 130 would have different curvature characteristics at the depth of 1500 meters, which would result in being subjected to greater strain from curving, greater pressures from depth, greater temperatures in drilling operations, greater likelihood of differential sticking due to contact with the borehole wall, or any other set of curvature characteristics. In addition, the downhole assembly 130 may have a curvature even in a straight borehole.

The curvature characteristics of the downhole assembly 130 may be determined by the types of materials that form the downhole assembly 130, the types of instruments and devices located on or in the downhole assembly 130, and any other geometrical or physical characteristics of the downhole assembly 130.

Curvature characteristics of downhole assembly or borehole may also be influenced by the environment around the downhole assembly 130, including pressure and temperature, as well as fluids and material in the borehole 141, and types of materials that make up the earth 140. For example, some drilling fluid materials or earth 140 compositions may result in increased strain, wear and fatigue of the downhole assembly 130 relative to others.

One example of a curvature characteristic is a bending moment characteristic. In embodiments of the invention, the "bending moment characteristic" refers to a force or moment that causes a particular bend or curve in a downhole assembly 130. However, the term "curvature characteristic" also includes curves in the downhole assembly that may not be caused by a bending force or moment, but which may instead be caused by other reasons, such as, for instance, a shape of the downhole assembly or by axial load. For example, one example of a component of a downhole assembly that is not caused by a bending moment characteristic is an adjustable kick off (AKO) sub, which is built with a tilt even when no force or moment is applied.

In addition, in the present specification and claims, the term "borehole curvature" refers to the geometry of the borehole. Embodiments of the invention relate to defining limits of the borehole curvature based on a number of factors, including bending moment characteristics of a downhole assembly 130 and other curvature characteristics of the downhole assembly 130, curvature characteristics of the borehole 141, or other curvature characteristics, such as requirements or optimization of production or other operational needs.

The processor 116 calculates borehole curvature limits based on the curvature characteristics as well as other factors. The borehole curvature limits may be based on thresholds that are predefined by a user, a manufacturer, a system, or by any other party or method. For example, a user or operator may indicate that a particular component in the downhole assembly 130 should not be subjected to bending load above a predetermined level for a predetermined period of time. The processor 116 uses the curvature characteristics based on the steady-state downhole assembly data 111 and downhole assembly measurements 112, to calculate the curvature (so-called dogleg severity) of the borehole 141 that would result in reaching the threshold bending load. In embodiments of the invention, the processor 116 calculates the curvature limits for a plurality of turning angles of the borehole. In other words, the processor 116 calculates the curvature limit that would result in the threshold bending load based on the borehole 141 curving upward ($\theta_U$), downward ($\theta_D$), left ($\theta_L$), right ($\theta_R$) and every combination of these. The bending load may also be affected by buoyancy due to mud, compressive loads, torque, and steering activity.

Based on the calculated curvature limits, a curvature of the borehole 141 may be selected within the curvature limits according to the operational goals of an operator or system, and the borehole 141 may be extended by drilling within the curvature limits.

In one embodiment, the borehole analysis computer 110 includes a graphics generator 115, or the processor 116 may include a graphics generator, to generate a graphical representation of the calculated curvature limits In one embodiment, the graphic representation is an envelope of permissible borehole curvatures in polar coordinates having a center point corresponding to the axis of the borehole 141, the downhole end segment 131 of the downhole assembly 130, or a straight downhole assembly section at the position of a bending load sensor (i.e. no bending stress at the bending load sensor). In one embodiment, the graphic representation is displayed on a display element of the I/O module 114. A user, operator, system, or other party may select a desired borehole curvature by referring to the graphic representation, and may provide inputs to the borehole analysis computer 110 to cause the downhole assembly control module 117 to generate control signals 124 to control the direction of a drilling segment of the downhole assembly 130 to drill the borehole 141 to have a curvature within the envelope represented by the graphic representation. Although an embodiment is described including the graphics generator 115, embodiments of the invention are not limited to a system including a graphics generator. For example, a system may calculate a borehole curvature envelope and provide information to users via alerts or alarms, or may automatically control a downhole system based on the calculated curvature envelope.

In embodiments of the invention, the curvature characteristics that are analyzed by the borehole analysis computer to calculate the borehole curvature limits may be any characteristic that would possibly limit the ability of the downhole assembly 130 to function in a manner required by a user, operator, or system controlling or using the downhole assembly 130, or a subsequent downhole assembly inserted into the borehole 141, or that would cause any undesirable damage to the formation, or that would lead to an undesired borehole trajectory. In one embodiment, the curvature characteristics include fatigue limits that are based on a predefined bending load of the drilling tool at which the drilling tool is estimated to break or to be otherwise damaged after a predetermined period of time of operating at the predefined bending load. In various embodiments, the fatigue limits may correspond to a drill bit or drilling segment, a drill pipe, a drilling string, a well completion string, a completions string, a workover string or any other string used to perform functions in the wellbore 141, a downhole sensor, electronic circuitry, downhole power systems, or any other components of the downhole assembly.

In various embodiments, the curvature characteristics of the downhole assembly or the borehole are calculated by determining the wear on a drilling tool or other component of the downhole assembly 130, the likelihood and severity of differential sticking of the downhole assembly 130, and sensor 133 positional or directional misalignments, or the ability of sensors or other electrical equipment to operate within predefined efficiency ranges. For example, a sensor arranged at a particular angle with respect to another component, such as a signal source, receiver or another sensor in the downhole assembly 130, may lose effectiveness when bending the downhole assembly 130. Accordingly, the effectiveness of the sensor 133 may be a factor contributing to the borehole curvature limit as calculated by the processor 116.

Additional factors that contribute to a borehole curvature limit include cumulative contact forces or friction extrapolated to the end of the hole section or hole total depth for the downhole assembly; cumulative contact forces or friction extrapolated to the end of the hole section or hole total depth for any subsequent type of downhole assembly, such as a casing string or next drilling downhole assembly; local wall contact forces or stresses that may cause tool failure, such as sensitive parts of the downhole assembly like sensors or antennas, excessive tool wear, or formation damage; risk of collision with another well; cost control; reacting to deflection of a hard interface; risk of getting stuck, e.g. due to keyseating; hole cleaning issues; or any other additional factors.

In one embodiment, the graphical representation generated by the processor 116 includes a plurality of envelopes of permissible borehole curvatures corresponding to a plurality of inclination angles ($\theta_I$) of the borehole, or the plurality of any other parameter, such as axial compression, drilling fluid density, and depth. For example, an operator may wish to determine whether a borehole curvature with a predetermined angle is possible at a predetermined depth in a borehole that has yet to be drilled. The graphical representation could display a first envelope corresponding to a first inclination angle of the borehole facing at a predetermined depth and a second envelope corresponding to a second inclination angle of the borehole facing at the predetermined depth. The operator could then select a desired inclination angle of the borehole at the predetermined depth to accommodate the desired borehole curvature of the borehole downhole from the predetermined depth.

In one embodiment, the processor 116 is configured to generate display data for displaying the graphical representation as a plurality of envelopes of borehole curvatures corresponding to a plurality of different curvature characteristics. In one embodiment, the graphical representation includes an indication of a criticality of different curvature characteristics relative to each other. For example, an envelope corresponding to a first curvature characteristic (such as tool wear) may be represented with a first color, a first dashed line, or any other differentiating marker, and an envelope corresponding to a second curvature characteristic (such as a cost to implement the indicated curvature) may be represented with a second color different from the first color, a second dashed line different from the first dashed line, or any other differentiating marker.

In one embodiment, the processor 116 generates display data to display the graphical representation as an envelope of permissible borehole curvatures in polar coordinates, and at least one of a currently-observed (or sensed) borehole curvature and a recently-observed borehole curvature.

Figure 3:
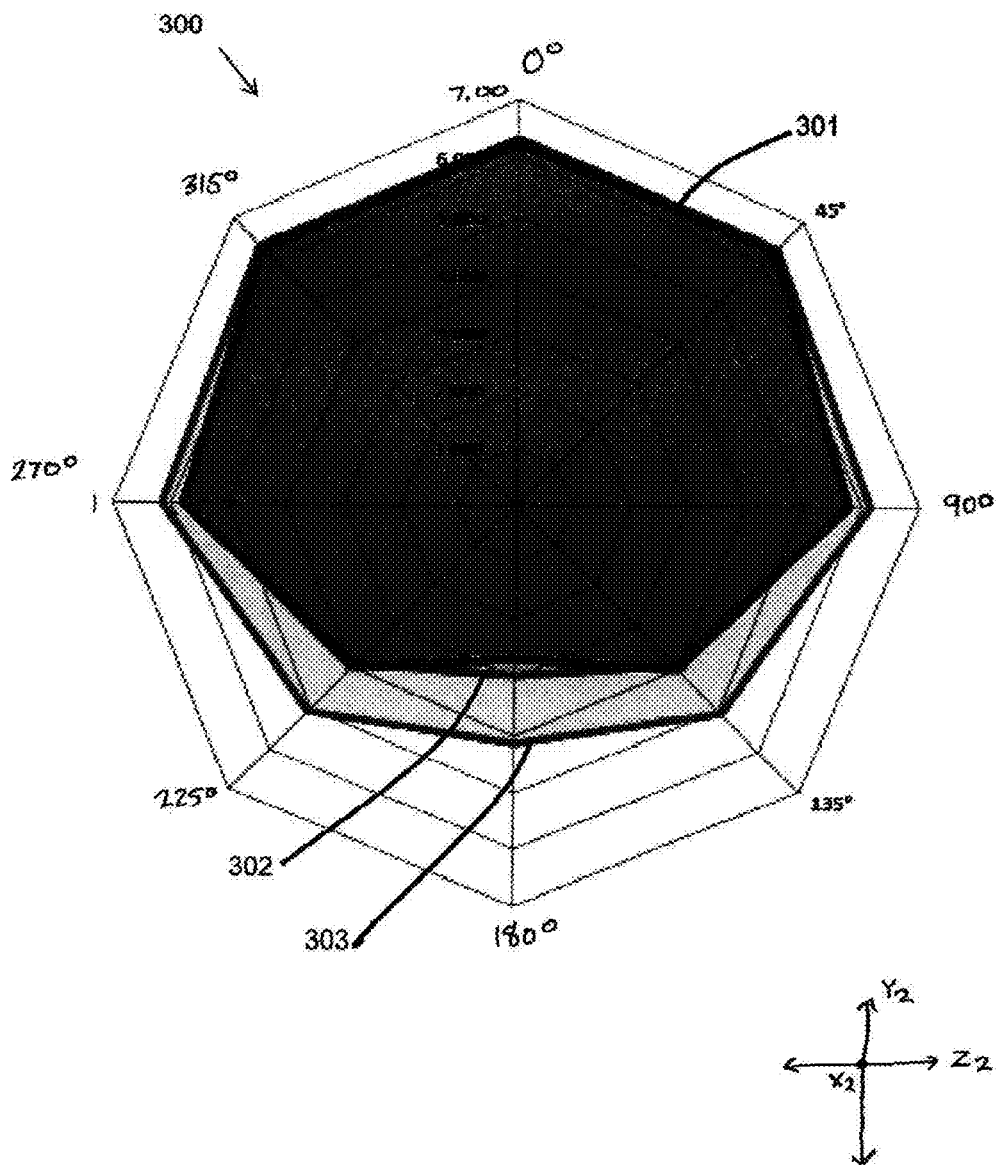
FIG. 3 illustrates a display of a permissible curvature according to an embodiment of the invention.

FIG. 3 illustrates a graphical representation 300 of permissible borehole curvatures according to one embodiment. Referring to FIG. 3, the angles (0 degrees, 45 degrees, 90 degrees, 135 degrees, 180 degrees, 225 degrees, 270 degrees, and 315 degrees refer to directions of a borehole. For example, a borehole that is to be extended upward and to the right would be turned towards the 45 degree line; a borehole that is to be extended directly to the right relative to the present borehole facing would be turned toward the 90 degree line; a borehole that is to be extended downward and to the right would be turned towards the 135 degree line; etc. In addition, the lines defining the concentric octagons represent curvature or angle change per predetermined distance, such as per 30 meters—also known as dogleg severities. For example, the inner-most octagon may represent a borehole curvature of one degree per 30 meters; the second octagon from the inside may represent a borehole curvature of two degrees per 30 meters; etc.

The envelopes 301, 302, and 303 represent borehole curvature limits calculated based on the steady-state curvature characteristics of a downhole assembly 130, or other characteristics of the downhole assembly 130 or borehole 141, as discussed above. Each envelope 301, 302, and 303 corresponds to a different borehole inclination angle $\theta_I$. In particular, the envelope 301 represents a high borehole inclination, between 60 to 90 degrees. The envelope 302 represents a medium borehole inclination having between 30 and 60 degrees. The envelope 303 represents a low borehole inclination having less than 30 degrees. As illustrated in FIG. 3, the level of inclination $\theta_I$ of the borehole affects the permissible curvature of the borehole. A borehole having a lower inclination angle, represented by the envelope 303, has a larger envelope than a borehole having a higher inclination angle, represented by the envelopes 301 and 302, indicating that the borehole may be curved more steeply, than if the borehole had a higher inclination angle.

In an embodiment in which the graphical representation 300, or the data represented by the graphical representation 300, or the data where the graphical representation 300 is calculated from, is used to plan a borehole that has not yet been formed, a planner or system may select inclination angles at various depths to achieve desired curvatures of the borehole further downhole. In an embodiment in which the graphical representation 300, or the data represented by the graphical representation 300, is used to plan a continuation of a pre-existing borehole, the operator or system may select curvature angles of the to-be-drilled borehole portions taking into account the data of the already drilled borehole to achieve predetermined objectives, such as avoiding damage to equipment.

In a real-time application, an operator or system would monitor the curving or bending of the downhole assembly and would generate alerts or modify the curving or bending of the downhole assembly. The curving or bending of the downhole assembly may be monitored by monitoring the azimuth and inclination of the downhole assembly and calculating the curvature accordingly, or by monitoring the bending moment of the downhole assembly at one point in the downhole assembly, using this and other data as well as calculation methods to estimate the borehole curvature at this time. In other words, a measured bending load of a downhole assembly can accurately predict or estimate the curvature of the borehole. As a result, an envelope of curvature may also be expressed as an envelope of bending load measured at a bending load sensor or predicted based on the measurement of a bending load sensor.

In an embodiment in which the graphical representation 300, or the data represented by the graphical representation 300, is used to analyze a pre-existing borehole, downhole assembly components may be selected having predetermined curvature characteristics to adjust the envelopes of the graphical representation 300, such that the selected downhole assembly components are capable of operating within the pre-existing borehole while keeping the borehole curvatures within the envelopes defined by the curvature characteristics of the selected downhole assembly components.

While FIG. 3 is illustrated with the envelopes 301, 302, and 303 corresponding to inclination angles $\theta_I$ of a borehole, embodiments of the invention encompass graphical representations including envelopes corresponding to other characteristics of a borehole or a downhole assembly, including azimuth angles, borehole diameter, earth formation properties, or any combination of curvature characteristics of the downhole assembly or the borehole or the permissible curvature of the downhole assembly or the borehole.

While an embodiment has been described in which the lines of the graphical representation correspond to an angle change per unit of depth or curvature, embodiments of the invention encompass similar graphical representations that represent other information, including bending loads calculated or observed at a bending moment measurement sensor. In such an embodiment, the radius of the graphical representation would refer to the bending moment observed at the sensor, whereas the directions of the octagon would refer to the direction of the bending load observed.

In one embodiment, the permissible borehole curvature is based on a determination of an importance or criticality of one or more components of the downhole assembly. For example, if a particular sensor 133 is redundant or relatively inexpensive to replace, then the likelihood of the sensor breaking may not be used to determine the permissible borehole curvature, or may be assigned a low weight or value in a calculation of the permissible borehole curvature. In contrast, an important or expensive component, such as a drill bit or power system, may contribute heavily to the determination of the permissible borehole curvature. The permissible borehole curvature may be calculated to avoid damage to the important or expensive components while discounting or disregarding redundant or inexpensive components. In embodiments of the invention, users, operators, or systems may assign greater or lesser value to any characteristics of downhole assembly 130 components, including cost to repair or replace, likely extent of damage to the component or surrounding components, whether the component is redundant, etc.

Embodiments of the invention encompass real-time analysis of a borehole 141 during a drilling operation, analysis of a prospective borehole 141 to plan the curvature of the borehole 141, as well as analysis of an existing borehole 141 to analyze a downhole assembly 130 that may be inserted into the borehole 141 or which has been inserted into the borehole 141.

Figure 4:
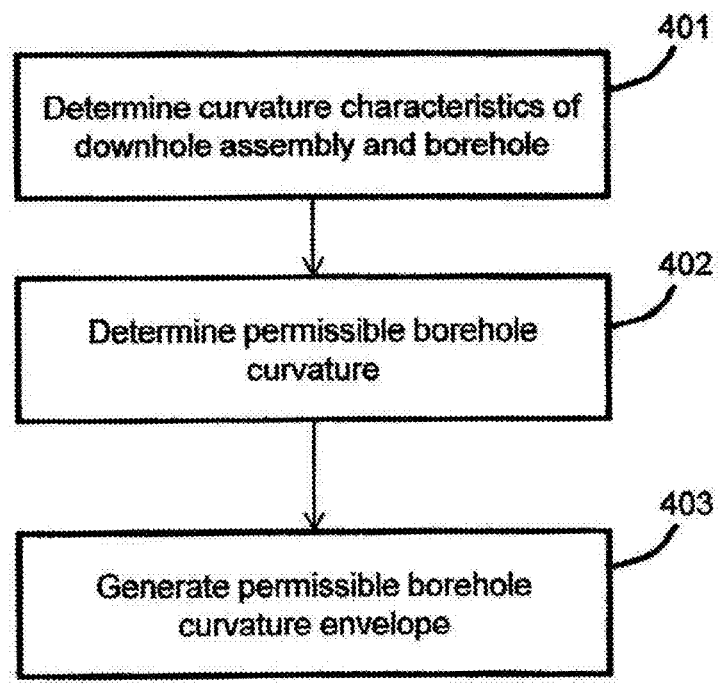
FIG. 4 is a flow diagram of a method of generating an envelope of a permissible borehole curvature according to an embodiment of the invention.

FIG. 4 is a flow diagram of a method according to an embodiment of the invention. In block 401, curvature characteristics of a downhole assembly or a borehole are determined. The curvature characteristics of the downhole assembly or the borehole are defined as characteristics of the downhole assembly or the borehole that are affected by curving of the downhole assembly or the borehole. Some examples of downhole assembly curvature characteristics include bending fatigue, logging-while-drilling measurement accuracy, predicted excessive cumulative friction along the borehole for the downhole assembly at a future depth or operating mode, predicted excessive cumulative friction along the borehole for any subsequent downhole assembly in the same borehole at any future depth or operating mode, predicted excessive wear at any given position along the downhole assembly, predicted differential sticking, predicted keyseating, etc. Examples of borehole curvature characteristics include avoidance of another borehole, predicted instability of an earth formation, predicted length of a hole section in a drain section of a reservoir, avoiding predicted earth faults, etc.

In block 402, a permissible curvature of the borehole is calculated based on the determined curvature characteristics. For example, the permissible curvature may be calculated to ensure that a bending load of the downhole assembly is maintained below a predetermined level to allow proper function of and/or to avoid damage to one or more components of the downhole assembly.

In block 403, the permissible curvature is calculated for a plurality of parameters such as borehole curvature or bending moment characteristics of the downhole assembly, to form a permissible curvature envelope. By doing so, other parameters may be taken into account such as weight on bit, hole size, or mud weight, for example. For example, permissible curvatures may be calculated based on turning the borehole in an upward direction (or 0 degrees), in an upper-left direction (or 45 degrees), in a directly left direction (or 90 degrees), etc. Alternatively, an iterative approach may be used. In one embodiment, generating the permissible borehole curvature envelope includes generating a graphical representation of the permissible borehole curvature envelope in a polar coordinate system having a center point corresponding to a direction of the borehole.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method for defining a permissible borehole curvature, comprising:
    determining curvature characteristics of at least one of a downhole assembly and a borehole;
    calculating, by a processor of a computer, an envelope of permissible borehole curvatures from a predetermined location in the borehole based on the curvature characteristics, a direction of the borehole at the predetermined location in the borehole, and a turning angle of the borehole relative to the direction of the borehole at the predetermined location; and
    automatically controlling the downhole assembly in real time based on the calculated envelope of permissible borehole curvatures.

2. The method of claim 1, further comprising:
    generating a representation of the envelope of permissible borehole curvatures on a display element of the computer.

3. The method of claim 2, wherein the representation of the envelope of permissible borehole curvatures includes a plurality of concentric shapes, each representing a degree of borehole curvature.

4. The method of claim 2, wherein the representation of the envelope of permissible borehole curvatures includes a plurality of concentric shapes, each representing a bending load of the downhole assembly.

5. The method of claim 1, wherein the envelope of permissible borehole curvatures is calculated based on the curvature characteristics of the borehole.

6. The method of claim 1, wherein the envelope of permissible borehole curvatures is calculated based on the curvature characteristics of the downhole assembly.

7. The method of claim 6, wherein determining the curvature characteristics includes calculating drag on a drill string.

8. The method of claim 7, wherein calculating the drag on the drill string includes calculating the drag on the drill string of a subsequent operation in the borehole.

9. The method of claim 1, further comprising:
    selecting a borehole curvature to be drilled by a drilling tool based on the calculated envelope of permissible borehole curvatures.

10. The method of claim 9, further comprising:
    drilling, by a drilling tool, the borehole having the selected borehole curvature.

11. The method of claim 1, further comprising:
    drilling, by a drilling tool, the borehole;
    during drilling, monitoring a curvature of the borehole; and
    generating an alert based on the curvature exceeding the envelope of permissible borehole curvatures.

12. The method of claim 11, further comprising:
    taking corrective action to adjust a path of the drilling tool based on the alert.

13. The method of claim 1, wherein calculating the envelope of permissible borehole curvatures includes taking into account a criticality of different curvature characteristics, such that less critical curvature characteristics have less of an effect on the envelope of permissible borehole curvatures than more critical curvature characteristics.

14. A borehole system, comprising:
    memory configured to store curvature characteristics of at least one of a downhole assembly and a borehole configured to be inserted in a borehole;
    a processor configured to calculate an envelope of permissible borehole curvatures downhole from a predetermined location in the borehole based on the curvature characteristics, a direction of the borehole at the predetermined location in the borehole, and a turning angle of the borehole relative to the direction at the predetermined location, and to automatically control a downhole assembly in real time based on the calculated envelope of permissible borehole curvatures.

15. The borehole system of claim 14, further comprising:
    a display apparatus configured to receive display data from the processor,
    wherein the processor is configured to generate the display data to generate a graphical representation on the display apparatus in polar coordinates of one of a bending load at a bending load sensor of the downhole assembly and the turning angle of the borehole relative to the direction at the predetermined location.

16. The borehole system of claim 14, further comprising:
    a display apparatus configured to receive display data from the processor,
    wherein the processor is configured to generate the display data to generate a graphical representation of the envelope of permissible borehole curvatures.

17. The borehole system of claim 16, wherein the processor is configured to generate the display data to generate on the display apparatus a plurality of envelopes of permissible borehole curvatures corresponding to a plurality of inclination angles of the borehole.

18. The borehole system of claim 16, wherein the processor is configured to generate display data for displaying on the display apparatus a graphical representation of a plurality of envelopes of permissible borehole curvatures corresponding to a plurality of different curvature characteristics.

19. The borehole system of claim 14, the processor is configured to calculate the envelope of permissible borehole curvatures downhole based on the curvature characteristics of the borehole.

20. The borehole system of claim 14, the processor is configured to calculate the envelope of permissible borehole curvatures downhole based on the curvature characteristics of the downhole assembly.

21. The borehole system of claim 14, wherein the display data includes an indication of a criticality of the different curvature characteristics relative to each other.

22. The borehole system of claim 14, wherein the envelope of permissible borehole curvatures is based on a determination of a level of criticality of one or more components of the downhole assembly.

23. A borehole system, comprising:
    a downhole assembly located in a borehole;
    a borehole analysis computer configured to generate an envelope of permissible borehole curvatures downhole from a predetermined location in the borehole based on curvature characteristics of at least one of the downhole assembly, a subsequent downhole assembly, and a borehole, and further based on a direction of the borehole at the predetermined location in the borehole and a turning angle of the borehole relative to the direction at the predetermined location, and to automatically control a downhole assembly in real time based on the calculated envelope of permissible borehole curvatures.

24. The borehole system of claim 23, wherein the downhole assembly includes a drilling assembly at a downhole end of the downhole assembly, and the borehole analysis computer is configured to control the drilling assembly to drill the borehole to have a curvature within the envelope of permissible curvatures.

25. The borehole system of claim 23, wherein the borehole analysis computer includes a user interface to receive a user selection of at least one of a borehole curvature and a curvature direction to be drilled by the drilling assembly based on a display of a graphical representation of the envelope of permissible borehole curvatures.

* * * * *